UNITED STATES PATENT OFFICE.

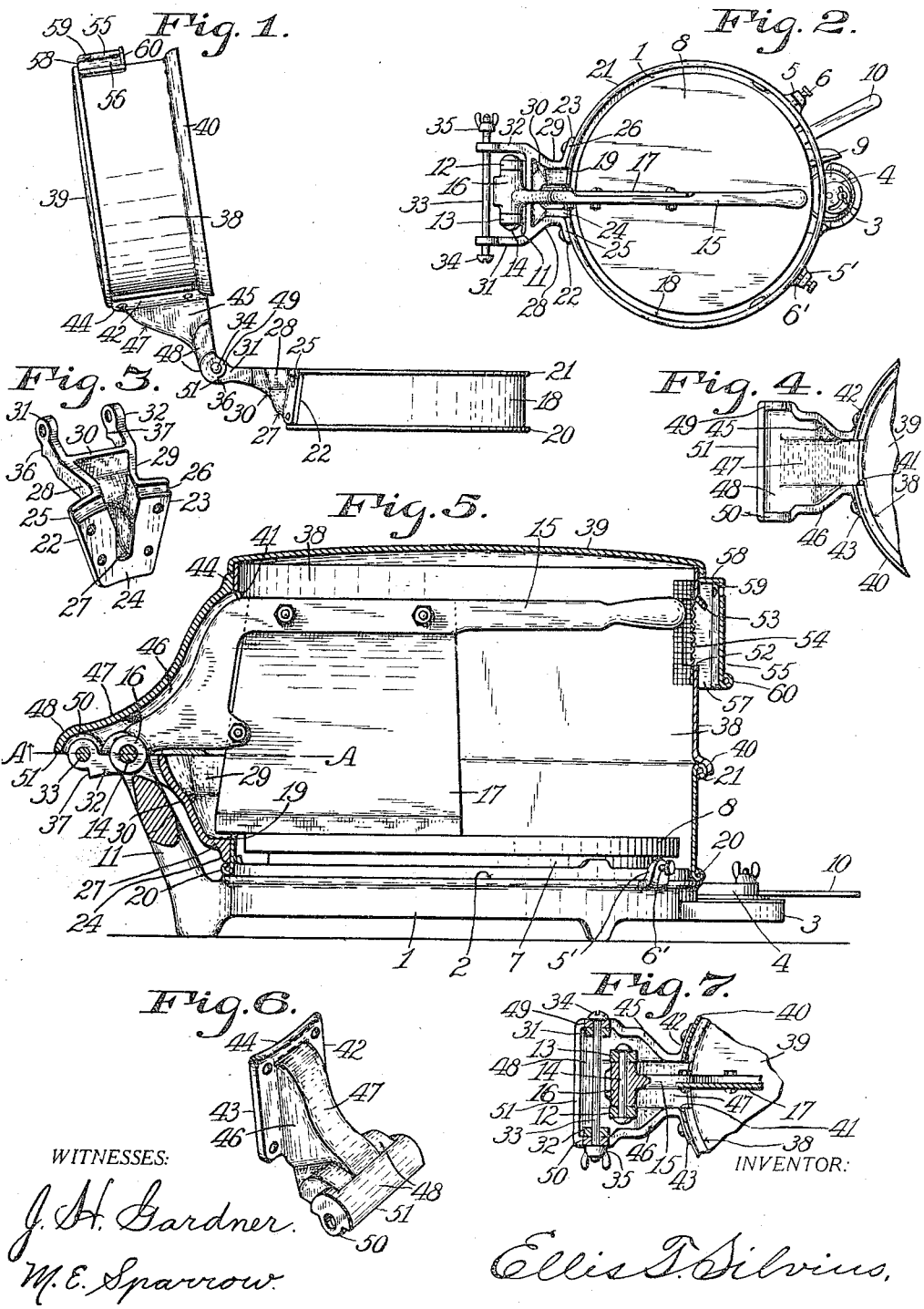

ELLIS T. SILVIUS, OF INDIANAPOLIS, INDIANA, ASSIGNOR TO THOMAS S. GETTLE, OF GREENFIELD, INDIANA.

REMOVABLE CHEESE-CUTTER COVER.

1,210,551. Specification of Letters Patent. Patented Jan. 2, 1917.

Application filed August 20, 1914. Serial No. 857,663.

*To all whom it may concern:*

Be it known that I, ELLIS T. SILVIUS, a citizen of the United States, residing at Indianapolis, in the county of Marion and State of Indiana, have invented a new and useful Removable Cheese-Cutter Cover, of which the following is a specification, reference being had to the accompanying drawings and to the letters and figures of reference marked thereon.

This invention relates to the type of machine that is designed to be used for cutting or dividing a cheese into portions to be sold, the invention having reference more particularly to a cover for the cheese cutting machine and more especially for the cheese thereon for protecting the cheese and also the cheese support and the cutting knife from insects and dust or other vitiating influences.

An object of the invention is to provide an improved cheese cutter cover of such construction as to effectively afford the desired protection for a cheese while being retailed in stores and afford ample ventilation under the cover, which cover shall be adapted to be conveniently and readily manipulated so as to not be obstructive to the usual operations of the cutting machine.

A further object is to provide a cheese cutter cover having the above-mentioned characteristics which shall be so constructed as to permit the user to readily remove the cover from the machine in case it is desired to place and use the cheese cutter in an icebox, refrigerator, or cooling room where a cheese cover may not be needed owing to the absence of insects and dust in such place.

A still further object is to provide a cheese cutter cover that shall be adapted to be used on common types of cheese cutters and be composed of a desirable number of parts detachably connected together so that when not in use all parts may be kept in assembled relation and ready for immediate use when required, and be especially advantageous to retailers who may desire to operate the cheese cutter in warm seasons in a cooling room where a cheese cover may be dispensed with, and in cool seasons use the machine in the open sales-room under protection of a cover for the cheese and the machine, which cover shall be of simple and durable construction and be economical in use.

With the above-mentioned and other objects in view, the invention consists in a cheese cutter cover comprising two principal parts of novel construction having detachable hinge connections adapting the cover to be applied to popular types of cheese cutters, one of the parts being preferably provided with an improved ventilator; and the invention consists further in the novel parts and in the novel combinations and arrangements of parts, including the novel combination of a cover with a cheese cutter, as hereinafter particularly described and further defined in the accompanying claims.

Referring to the drawings,—Figure 1 is a side elevation of the improved cheese cutter cover in open position; Fig. 2 is a top plan of the cheese cutter on which the supporting part of the cover is arranged; Fig. 3 is a perspective view of a casting for forming an off-set portion of the supporting part of the cover and provided with hinge arms; Fig. 4 is a fragmentary inverted plan of the movable crown part of the cover; Fig. 5 is a side elevation of the cheese cutter and central vertical section of the improved cover applied thereto; Fig. 6 is a perspective view of a casting for forming an off-set portion of the crown part of the cover and provided with hinging ears; and, Fig. 7 is a fragmentary section on the line A A on Fig. 5 looking upward.

Similar reference characters on the different figures of the drawings indicate like parts or features of construction herein referred to.

The cheese cutter to which the improved cover may be advantageously applied may be variously constructed, a familiar type of cutting machine comprising an annular main frame 1 having a ledge 2 for supporting a cover, the forward portion of the frame having a table 3 thereon that supports an adjustable stop 4 to determine the amount of movement of the cheese to cut the required thickness of slice therefrom. The frame preferably is provided with upward extending ears 5 and 5′ provided respectively with set screws 6 and 6′ that are projectable above the ledge 2 for securing the supporting part of the cover to the frame. A cheese table frame 7 is rotatably supported on the main frame, as will be understood, and has a cheese supporting board or table top 8 thereon. A setting device 9 is suitably supported so as to be moved to or from the adjustable stop 4, and the machine is also provided with an operating lever 10 for periodically turning the table the required distance, which features are well-known in machines of this character, and further description therefore is unnecessary. The main frame 1 has a pivot-supporting standard 11 which extends upwardly from the rear portion of the frame and has two pivoting ears 12 and 13 thereon provided with a pivot pin 14. A knife frame 15 has a boss 16 which is mounted on the pivot pin between the two pivoting ears, and a cutting knife 17 is secured to the knife frame to coöperate with the board or top 8 of the table, the knife being bolted to the knife frame so as to be removable to be sharpened or replaced by another. The pivot pin 14 preferably is permanently connected to the pivoting ears 12 and 13 so that the accuracy of the movement required of the knife frame and the knife cannot be disturbed by careless attendants.

The improved cover comprises an annular supporting part 18 composed of sheet metal, the rear upper portion of which has a recess or gap 19 therein to receive the rear end or heel of the cutting knife which as will be understood extends rearward beyond the board 8, the lower portion of the part 18 having a bead 20 formed thereon that normally rests upon the ledge 2, the part being secured on the ledge by the set screws 6 and 6' projected over the bead. The upper portion of the part 18 has a bead 21 formed thereon. The off-set portion of the supporting part 18 is formed of a casting comprising base portions 22 and 23 that are secured to the sheet metal portion of the part on opposite sides of the recess or gap, and a tie portion 24 that extends below the gap, the upper ends of the portions 22 and 23 having off-sets 25 and 26 receiving the end portions of the bead 21. A cavity bottom 27 and sides 28 and 29 extend outward from the base portions, the sides extending upward to the plane of the top of the supporting part as does a back wall 30 that extends upward from the bottom 27 and is connected to the sides 28 and 29, said sides and back wall supporting two hinging arms 31 and 32 that extend rearward past the outer sides of the pivot ears 13 and 12 respectively and removably support a hinge pin 33 having a head 34 on one end and a thumb nut 35 on the opposite end thereof. The arms 31 and 32 have stop shoulders 36 and 37 formed thereon below the pivot pin.

The crown part of the improved cover comprises a cylindrical wall or shell portion 38 having a top 39 thereon, the lower portion of the wall having an outward flaring flange 40 that normally rests upon the supporting part 18 in contact with the flange 21. The supporting part 18 incases the table of the cutting machine and also the lower portion of the cheese, the crown part incasing and covering the upper portion of the cheese and the cutting knife and its frame, the rear portion of the shell 38 having a gap 41 therein receiving the knife and its frame, the knife frame being partially arranged in the off-set portion of the crown part. The off-set portion comprises base portions 42 and 43 secured to the wall or shell 38 on opposite sides of the gap, a tie portion 44 extending across above the gap and from which extends two side plates 45 and 46 and a top portion 47 to which a hood 48 is connected that extends over and beyond the pivot support 11 and the boss 16 of the knife frame, the hood having two hinging ears 49 and 50 that coöperate with the outer sides of the hinge arms 31 and 32 respectively and receive the removable hinge pin 33 whereby the crown part offset portion is hingedly connected removably to the offset portion of the annular supporting part of the cover. The hood 48 has a terminal stop portion 51 adapted to form a stop against the shoulders 36 and 37 when the crown part is swung back from its normal position.

In order to provide ventilation for the cheese, an aperture 52 is cut in the wall 38 adjacent to the top 39 and a shield 53 is formed of a portion of the wall so as to extend at an inclination downward and outward, the aperture preferably being covered by a screen 54 for excluding insects. A combined ventilation and handle device comprises a front plate 55, and also side plates 56 and 57 and a top plate 58 extending from the front plate and secured to the wall 38, the side plates being on opposite sides of the aperture and the top plate above the shield 53. The front plate 55 has ventilation apertures 59 in its upper portion, and a bead 60 is formed on the lower end of the plate to constitute a handhold.

In practical use the crown part of the cover is swung back on its hinge and permits the knife frame to be swung back to permit the operation of the cheese table to move the cheese the required distance. When a cut is made by the cutting knife to divide off a portion of the cheese the knife is brought down upon the board 8 and permitted to remain until another operation is required, after which the crown part of the cover is swung forward to normal position. The offset portions of the two parts coöperate to prevent the entrance of insects and exclude dust from the cheese, which is the purpose of the two main parts of the cover, the latter effectually accomplishing the purpose and permitting ventilation through the aperture 52 and the apertures 59, the light which may enter through the apertures 59 being prevented by the shield 53 entering the aperture 52, so that the interior of the cover remains darkened, as is desired.

When it is preferred to use the cheese cutter without a cover the hinge pin 33 is readily removed from its place after which the crown part is removed from its normal position. After elevating the knife frame and swinging it back so as to clear the offset portion of the annular supporting part of the cover, the supporting part is released from the frame and raised from the ledge 2 after which it is drawn forward and away from the machine. The hinge pin 33 should then be replaced so as to connect the crown part to the base part of the cover, leaving the complete cover in proper condition to be again applied to the cutting machine when desired.

Having thus described the invention, what is claimed as new, is—

1. A cheese cutter cover including two hingedly connected parts, one of the parts being normally supported upon the remaining one of the parts.

2. A cheese cutter cover including two coöperating parts having each an offset portion, the offset portions being hingedly connected together.

3. A cheese cutter cover including two coöperating parts, one of the parts being annular and the other a crown part detachably hinged to and supported by the annular one of the parts.

4. A cheese cutter cover including an annular part having an offset portion, and a crown part having an offset portion constructed to hingedly coöperate with the offset portion of the annular part and having detachable hinging connection therewith.

5. A cheese cutter cover including two coöperating parts, one of the parts being annular, the remaining one of the parts being a crown part and normally resting upon and covering the annular part, the two parts being detachably hinged together.

6. A cheese cutter cover including an annular part, a crown part constructed to rest upon and cover the annular part and provided with a combined ventilator and handle device, the wall of the crown part having an aperture therein behind the device.

7. A cheese cutter cover including two coöperating parts, one of the parts being annular, the remaining one of the parts being a crown part and normally resting upon and covering the annular part and provided in the upper portion thereof with a ventilator, the two parts being hinged together.

8. A cheese cutter cover including an annular part having an offset portion provided with a hinging member, a crown part to coöperate with the annular part and having an offset portion provided with a hinging member, and a hinge pin detachably connecting the hinging members of the offset portions hingedly together.

9. A cheese cutter cover including an annular part having an offset portion provided with two projecting hinge members, a crown part normally resting upon and covering the annular part and having an offset portion provided with a hood extending over the hinge members, the hood having two hinging ears thereon, and a hinge pin extending removably through the hinging ears and the hinge members.

10. A cheese cutter cover including an annular part provided with two projecting hinge members, a crown part constructed to coöperate with the annular part to constitute a complete cover and provided with two hinge members constructed to coöperate with and cover the hinge members of the annular part, and a hinge pin detachably connecting the hinge members of the crown part to the hinge members of the annular part.

11. In a cheese cutter cover, the combination of a crown part having an aperture in the upper portion of the side wall thereof, the wall having a shield thereon above the aperture extending downward and outward, a screen secured to the inner side of said wall and extending across said aperture, and a handle device comprising a front plate and two side plates and also a top plate extending from the front plate, the two side plates being secured to the exterior of said wall on opposite sides respectively of said aperture, the top plate being secured to the exterior of said wall above said shield, said front plate having an aperture therein above the plane of said shield, the lower end of said front plate having a hand-hold formed thereon.

12. The combination with a cheese cutter comprising a main frame having a pivot support, a cheese-supporting table on the main frame, a knife frame pivoted to the pivot support, and a cutting knife secured to the knife frame, of an annular cover part seated on the main frame and having an offset portion provided with two hinge arms thereon extending past two opposite sides respectively of the pivot support, a crown cover part normally resting removably upon the annular part and having an offset portion provided with a hood extending over the hinge arms, the hood having two hinge ears adjacent the outer sides of the two hinge arms respectively, a hinge pin removably inserted through the hinge ears and the hinge arms, and means coöperating with the main frame remote from the pivot support detachably securing the annular cover part fixedly to the main frame.

13. The combination with a cheese cutter comprising a main frame having a knive pivot on the outer side thereof and also an annular cover part having a hinge member extending adjacent to and outward farther than the knife pivot, a cheese-supporting table on the main frame and surrounded by the cover part, a knife frame connected to the knife pivot, and a cutting knife secured to the knife frame, of a crown cover part normally resting removably upon the annular cover part and having a hinge member extending outward farther than the knife pivot and hingedly connected to the hinge member of the annular cover part at a distance outward beyond the knife pivot.

14. The combination with a cheese cutter comprising a main frame having a pivot support, a cheese-supporting table on the main frame, a knife frame pivoted to the pivot support, and a cutting knife secured to the knife frame, of an annular cover part seated on the main frame and having a hinge member extending into proximity to the pivot support, and a crown cover part normally resting removably upon the annular part and having a hinge member extending to the hinge member of the annular part and also into proximity to the pivot support, the hinge member of the crown cover part having a hinging connection with the hinge member of the annular cover part in proximity to the pivot support.

In testimony whereof, I affix my signature in presence of two witnesses.

ELLIS T. SILVIUS.

Witnesses:
J. H. GARDNER,
M. E. SPARROW.

Copies of this patent may be obtained for five cents each, by addressing the "Commissioner of Patents, Washington, D. C."